(12) United States Patent
Yoshida

(10) Patent No.: US 8,174,666 B2
(45) Date of Patent: May 8, 2012

(54) APPARATUS AND METHOD FOR MANUFACTURING DISPLAY PANEL, AND DISPLAY PANEL MANUFACTURED BY THE METHOD

(75) Inventor: Tokuo Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 276 days.

(21) Appl. No.: 12/518,463

(22) PCT Filed: Nov. 12, 2007

(86) PCT No.: PCT/JP2007/071939
§ 371 (c)(1),
(2), (4) Date: Jun. 10, 2009

(87) PCT Pub. No.: WO2008/129712
PCT Pub. Date: Oct. 30, 2008

(65) Prior Publication Data
US 2010/0208190 A1  Aug. 19, 2010

(30) Foreign Application Priority Data

Mar. 30, 2007 (JP) ................................. 2007-091868

(51) Int. Cl.
G02F 1/13 (2006.01)
(52) U.S. Cl. ..................... 349/187; 349/160; 156/379.8; 156/446; 156/221; 445/25
(58) Field of Classification Search ................. 349/187, 349/160; 156/379.8, 446, 221; 445/25
See application file for complete search history.

(56) References Cited

U.S. PATENT DOCUMENTS

| | | | | |
|---|---|---|---|---|
| 5,959,762 A | * | 9/1999 | Bandettini et al. | 359/265 |
| 2002/0196393 A1 | * | 12/2002 | Tashiro et al. | 349/106 |
| 2004/0135958 A1 | * | 7/2004 | Pan et al. | 349/153 |
| 2007/0153182 A1 | * | 7/2007 | Bang | 349/124 |
| 2008/0002137 A1 | * | 1/2008 | Kim et al. | 349/187 |

FOREIGN PATENT DOCUMENTS

| | | | |
|---|---|---|---|
| JP | 62-150219 A | | 7/1987 |
| JP | 62-238526 A | | 10/1987 |
| JP | 2002-014359 | * | 1/2002 |
| JP | 2002-014359 A | | 1/2002 |
| JP | 2007-033537 A | | 2/2007 |

OTHER PUBLICATIONS

Official Communication issued in International Patent Application No. PCT/JP2007/071939, mailed on Dec. 18, 2007.

* cited by examiner

*Primary Examiner* — Edward Glick
*Assistant Examiner* — Sang Nguyen
(74) *Attorney, Agent, or Firm* — Keating & Bennett, LLP

(57) ABSTRACT

A liquid crystal display panel manufacturing apparatus for successively bonding a pair of film substrates, each having a plurality of display regions defined at least along a longitudinal direction, along the longitudinal direction through a sealant formed in every display region of one of the film substrates includes: a first processing unit arranged to form a bonded body by bonding the film substrates so that the respective display regions are superimposed on each other; and a second processing unit including a molding roll configured to hold the bonded body formed in the first processing unit onto a peripheral wall thereof, and arranged to mold the bonded body into a curved shape along the peripheral wall of the molding roll by curing the sealant while holding the bonded body on the peripheral wall of the molding roll.

11 Claims, 13 Drawing Sheets

APPARATUS AND METHOD FOR MANUFACTURING DISPLAY PANEL, AND DISPLAY PANEL MANUFACTURED BY THE METHOD

BACKGROUND OF THE INVENTION

1. Field of the Invention

The present invention generally relates to an apparatus and a method for manufacturing a display panel, and a display panel manufactured by the method. More particularly, the present invention relates to a manufacturing technique of a curved display panel.

2. Description of the Related Art

Flexible display panels using flexible film substrates instead of conventionally used glass substrates have been developed in the fields of liquid crystal displays, organic EL (Electro Luminescence) displays, and the like.

For example, Japanese Published Patent Application No. S62-150219 discloses a manufacturing method of a flexible electrooptic device in which evacuation and injection are performed on every predetermined number of cells without cutting a band-shaped cell substrate. Japanese Published Patent Application No. S62-150219 describes that this method significantly reduces the injection time of a liquid material, and that continuous processing using rolls is easily applicable to this method.

Moreover, by taking advantage of the flexibility of film substrates, display panels molded in a curved shape have been recently proposed to obtain the panel shape according to the surface profile and the size of a panel installation place, and to improve the design.

For example, Japanese Published Patent Application No. S62-238526 discloses a manufacturing method of a curved liquid crystal display device in which a sealant between a pair of glass substrates of a liquid crystal display device is cured with the substrates being held under pressure between a male curved jig having a primary convex surface and a female curved jig having a primary concave surface corresponding to the convex surface.

Incidentally, a roll-to-roll method capable of continuously processing a film substrate is preferable in terms of productivity for manufacturing of display panels using film substrates. Manufacturing a curved display panel by the manufacturing method disclosed in Japanese Published Patent Application No. S62-238526 requires multiple sets of rigid pressing jigs such as the male curved jig and the female curved jig, and also requires a space for installing or storing these multiple jigs, thereby increasing a footprint. Thus, this manufacturing method still has room for improvement in terms of the manufacturing cost and the apparatus cost.

SUMMARY OF THE INVENTION

In view of the above problems, preferred embodiments of the present invention reduce the manufacturing cost and the apparatus cost for manufacturing a curved display panel as much as possible.

According to a preferred embodiment of the present invention, a bonded body including a pair of film substrates is molded into a curved shape by curing a sealant between the film substrates while holding the bonded body onto a peripheral wall of a molding roll.

More specifically, a display panel manufacturing apparatus according to a preferred embodiment of the present invention is an apparatus for manufacturing a display panel by successively bonding a pair of film substrates, each having a plurality of display regions defined at least along a longitudinal direction, along the longitudinal direction through a sealant formed in every display region of one of the film substrates. The apparatus includes: a first processing unit arranged to form a bonded body by bonding the pair of film substrates so that the respective display regions are superimposed on each other; and a second processing unit including a molding roll configured to hold the bonded body formed in the first processing unit onto a peripheral wall thereof, and arranged to mold the bonded body into a curved shape along the peripheral wall of the molding roll by curing the sealant while holding the bonded body on the peripheral wall of the molding roll.

According to the above structure, a curved display panel is manufactured by: first forming the bonded body in the first processing unit by successively bonding the pair of film substrates through the sealant along the longitudinal direction; and then molding the bonded body into a curved shape by the molding roll in the second processing unit. In the second processing unit, the sealant is cured while holding the bonded body formed in the first processing unit on the peripheral wall of the molding roll. This enables the bonded body to be continuously molded along the longitudinal direction, thereby achieving higher productivity, and eliminating the need for multiple sets of pressing jigs such as male and female molds. Thus, the manufacturing cost and the apparatus cost for manufacturing a curved display panel can be reduced as much as possible.

An electrode pattern for holding the bonded body by electrostatic force may be provided in the peripheral wall of the molding roll.

According to the above structure, the bonded body formed in the first processing unit is held onto the peripheral wall of the molding roll by Coulomb force generated at the peripheral wall of the molding roll through the electrode pattern. Thus, the functions, advantages and effects according to a preferred embodiment of the present invention are specifically obtained.

A suction hole for vacuum holding the bonded body may be provided in the peripheral wall of the molding roll.

According to the above structure, the bonded body formed in the first processing unit is held onto the peripheral wall of the molding roll by suction force generated at the peripheral wall of the molding roll through the suction hole. Thus, the functions, advantages and effects according to a preferred embodiment of the present invention are specifically obtained.

The second processing unit may include a light source for curing the sealant.

According to the above structure, in the case where the sealant for bonding the pair of film substrates is made of, for example, a UV-curable resin, the sealant is cured and the bonded body is molded into a curved shape in the second processing unit by emitting UV light from a UV lamp as a light source to the sealant of the bonded body formed in the first processing unit while holding the bonded body on the peripheral wall of the molding roll. Thus, the functions, advantages and effects according to a preferred embodiment of the present invention are specifically obtained.

A reflection suppressing film arranged to suppress reflection of light emitted from the light source may be provided in the peripheral wall of the molding roll.

According to the above structure, the reflection suppressing film prevents the light from the light source from reflecting from the peripheral wall of the molding roll into, for example, a liquid crystal material enclosed between the pair of film substrates through the sealant.

The second processing unit may include a heat source for curing the sealant.

According to the above structure, in the case where the sealant for bonding the pair of film substrates is made of, for example, a thermosetting resin, the sealant is cured and the bonded body is molded into a curved shape in the second processing unit by heating the bonded body formed in the first processing unit by the heat source such as a heater while holding the bonded body on the peripheral wall of the molding roll. Thus, the functions, advantages and effects according to a preferred embodiment of the present invention are specifically obtained.

The first processing unit may include a pair of bonding rolls, and may be configured to bond the pair of film substrates by passing the film substrates between the pair of bonding rolls.

According to the above structure, the bonded body of the pair of film substrates is formed by passing the pair of film substrates between the pair of bonding rolls so that the respective display regions are superimposed on each other. Thus, the functions, advantages and effects according to a preferred embodiment of the present invention are specifically obtained.

The first processing unit may include a liquid crystal dispenser to supply a liquid crystal material to every display region of one of the pair of film substrates.

According to the above structure, one film substrate having the liquid crystal material supplied thereon and the other film substrate are bonded by the pair of bonding rolls in the first processing unit after the liquid crystal material is supplied from the liquid crystal dispenser to one of the pair of substrates. Thus, a bonding apparatus used in a more productive one-drop-fill (ODF) method than a conventional dip injection method is specifically configured.

The first processing unit and the second processing unit may be configured to be switchable between a vacuum atmosphere and an atmospheric atmosphere.

According to the above structure, the respective surfaces of the film substrates of the bonded body can be pressed by, for example, returning at least the second processing unit to the atmospheric atmosphere after the first processing unit and the second processing unit are set to the vacuum atmosphere and the bonded body is formed by bonding the pair of film substrates through the frame-shaped sealant.

The second processing unit may include a dividing cutter to divide the bonded body at least into molding units by contacting, on the peripheral wall of the molding roll, the bonded body held and molded on the peripheral wall of the molding roll.

According to the above structure, the bonded body is divided at least into the molding units (e.g., into the display regions, or into a plurality of display regions) in the second processing unit by bringing the dividing cutter into contact with the bonded body held and molded on the peripheral wall of the molding roll. Thus, the functions, advantages and effects according to a preferred embodiment of the present invention are specifically obtained.

An electrode pattern for holding the bonded body by electrostatic force may be provided in the peripheral wall of the molding roll, and the electrode pattern may have a slit formed at a position where the dividing cutter contacts through the bonded body.

According to the above structure, the electrode pattern provided in the peripheral wall of the molding roll has a slit at a predetermined position. Thus, when the bonded body is divided into the display regions or into a plurality of display regions by bringing the dividing cutter into contact with the bonded body on the peripheral wall of the molding roll, the dividing cutter contacts the position of the slit formed in the electrode pattern, thereby preventing any damage to the electrode pattern by the dividing cutter.

Moreover, a manufacturing method of a display panel according to a preferred embodiment of the present invention is a method for manufacturing a display panel by successively bonding a pair of film substrates, each having a plurality of display regions defined at least along a longitudinal direction, through a sealant formed in every display region of one of the film substrates along the longitudinal direction. The method includes: a bonding step of forming a bonded body by bonding the pair of film substrates so that the respective display regions are superimposed on each other; and a molding step of molding the bonded body formed in the bonding step into a curved shape along a peripheral wall of a molding roll by curing the sealant while holding the bonded body on the peripheral wall of the molding roll.

According to the above method, a curved display panel is manufactured by: first forming the bonded body in the bonding step by successively bonding the pair of film substrates through the sealant along the longitudinal direction; and then molding the bonded body into a curved shape by the molding roll in the molding step. In the molding step, the sealant is cured while holding the bonded body formed in the bonding step on the peripheral wall of the molding roll. This enables the bonded body to be continuously molded along the longitudinal direction, thereby achieving higher productivity, and eliminating the need for multiple sets of pressing jigs such as male and female molds. Thus, the manufacturing cost and the apparatus cost for manufacturing a curved display panel can be reduced as much as possible.

The sealant may be made of a resin having at least one of a UV-curable property and a thermosetting property.

According to the above method, the sealant for bonding the pair of film substrates is made of a resin having at least one of a UV-curable property and a thermosetting property. Thus, the sealant is cured and the bonded body is molded into a curved shape in the molding step by emitting UV light to the sealant of the bonded body formed in the bonding step, by heating the bonded body itself, or by performing both UV light emission and heating. Thus, the functions, advantages and effects according to a preferred embodiment of the present invention are specifically obtained.

The method may further include a liquid crystal supplying step of supplying a liquid crystal material to every display region of one of the pair of film substrates before the bonding step.

According to the above method, one film substrate having the liquid crystal material supplied thereon and the other film substrate are bonded in the bonding step after the liquid crystal material is supplied to one of the pair of substrates in the liquid crystal supplying step. Thus, a more productive ODF method than a conventional dip injection method is specifically configured.

The method may further include a dividing step of dividing the bonded body molded in the molding step at least into molding units.

According to the above method, the bonded body formed in the molding step is divided at least into the molding units (e.g., into the display regions, or into a plurality of display regions) in the dividing step. Thus, the functions, advantages and effects according to a preferred embodiment of the present invention are specifically obtained.

The method may further include a half-cut step of forming a half-cut groove in one of the pair of film substrates so that the half-cut groove extends along a width direction at least in every molding unit, and so that the half-cut groove is located outside in the bonded body. In the molding step, the bonded body may be held onto the peripheral wall of the molding roll from the one film substrate side, and in the dividing step, the other film substrate may be divided and the one film substrate may be divided through the groove by bringing a dividing cutter into contact with the bonded body held on the peripheral wall of the molding roll so that the dividing cutter is located along the groove.

According to the above method, the half-cut groove is first formed in one film substrate in the half-cut step so as to extend along the width direction, and the bonded body is then held and molded on the peripheral wall of the molding roll in the molding step so that the groove is located inside. In the dividing step, the bonded body held on the peripheral wall of the molding roll is divided at least into the molding units by bringing the dividing cutter into contact with the bonded body held on the peripheral wall of the molding roll. More specifically, the bonded body held on the peripheral wall of the molding roll is divided at least into the molding units by bringing the dividing cutter into contact with the upper film substrate, that is, the other film substrate, entirely in the thickness direction over the peripheral wall of the molding roll, while bringing the dividing cutter into contact with an upper portion of the lower film substrate, i.e., an upper portion of one film substrate, in the thickness direction, that is, bringing the dividing cutter into contact with the bottom of the groove located away from the peripheral wall of the molding roll. Thus, the bonded body is divided at least into the molding units without making the dividing cutter in contact with the peripheral wall of the molding roll, thereby preventing any damage to the peripheral wall of the molding roll by the dividing cutter.

The method may further include a seal forming step of forming the sealant in a frame shape in every display region on one of the pair of film substrates before the bonding step. In the bonding step, after a bonded body is formed by bonding the pair of film substrates in a vacuum atmosphere, the bonded body may be returned to an atmospheric atmosphere to press respective surfaces of the film substrates of the bonded body.

According to the above method, the bonded body is first formed in the bonding step by bonding the pair of film substrates in the vacuum atmosphere. Then, by returning the bonded body to the atmospheric pressure atmosphere, a pressure difference is generated in the bonded body between the inside and outside the sealant formed in a frame shape in the seal forming step, and the respective surfaces of the film substrates of the bonded body are pressed so as to reduce the pressure difference. Thus, the functions, advantages and effects according to a preferred embodiment of the present invention are specifically obtained.

Moreover, a display panel according to a preferred embodiment the present invention is a display panel manufactured by the manufacturing method of the display panel of the present invention.

According to the above structure, the manufacturing efficiency for manufacturing a curved display panel is improved as much as possible. Thus, the functions, advantages and effects according to a preferred embodiment of the present invention are specifically obtained.

A liquid crystal material may be enclosed between the pair of film substrates through the sealant.

According to the above structure, a curved liquid crystal display panel is structured. Thus, the functions, advantages and effects according to a preferred embodiment of the present invention are specifically obtained.

According to various preferred embodiments of the present invention, a bonded body formed by bonding a pair of film substrates is molded into a curved shape by curing a sealant formed between the film substrates while holding the bonded body on a peripheral wall of a molding roll. This enables the manufacturing cost and the apparatus cost for manufacturing a curved display panel to be reduced as much as possible.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 2 is a perspective view of a molding roll 25a of the LCD panel manufacturing apparatus 30a.

FIG. 3 is a top view of a liquid crystal mask 24a of the LCD panel manufacturing apparatus 30a.

FIG. 5 is a top view of a bonded body 5 formed in a first processing unit 10a of the LCD panel manufacturing apparatus 30a.

FIG. 6 is a top view of a region around a dividing cutter 28 of the LCD panel manufacturing apparatus 30a.

FIG. 8 is a cross-sectional view of a LCD panel P manufactured by the LCD panel manufacturing apparatus 30a.

DETAILED DESCRIPTION OF THE PREFERRED EMBODIMENTS

Hereinafter, preferred embodiments of the present invention will be described in detail based on the accompanying drawings. Note that the present invention is not limited to the preferred embodiments described below.

First Preferred Embodiment

FIGS. 1 through 8 show a first preferred embodiment of the present invention. Note that, in the preferred embodiments described below, a liquid crystal display (LCD) panel having a liquid crystal material enclosed between a pair of film substrates is described as an example of a display panel.

Figure 1:
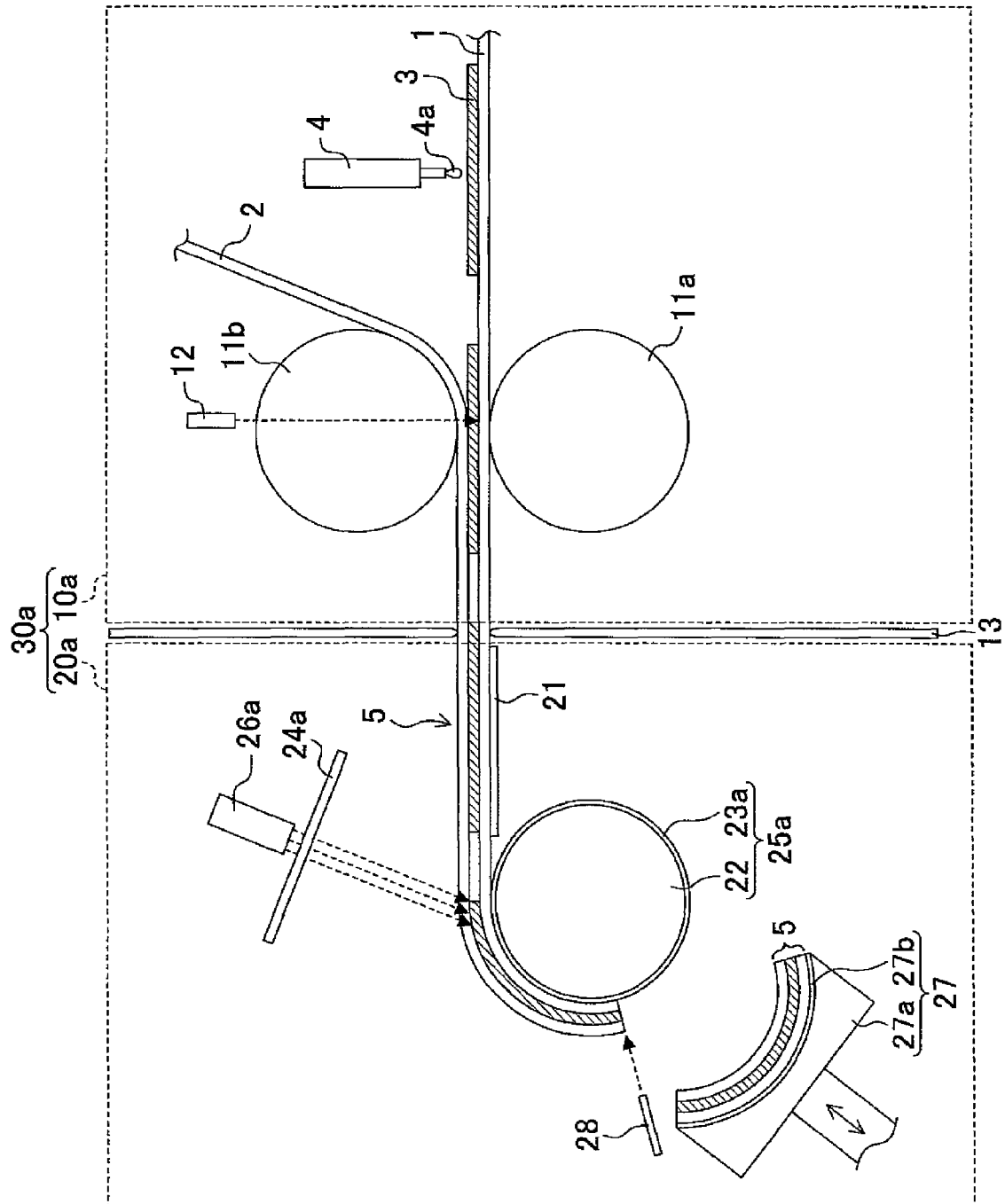
FIG. 1 is a side view of a liquid crystal display (LCD) panel manufacturing apparatus 30a according to a first preferred embodiment of the present invention.

FIG. 1 is a side view of an LCD panel manufacturing apparatus 30a of the present preferred embodiment.

As shown in FIG. 1, the LCD panel manufacturing apparatus 30a includes a first processing unit 10a and a second processing unit 20a which are connected to each other through a pair of open/close gates 13. The LCD panel manufacturing apparatus 30a is configured to first form a bonded body 5 in the first processing unit 10a by successively bonding a TFT (Thin Film Transistor) film substrate 1 and a CF (Color Filter) film substrate 2, each having a plurality of display regions D (see FIG. 5) defined in a matrix pattern along the longitudinal direction and the width direction, through sealants 3a and peripheral seals 3 (see FIG. 5) provided on the TFT film substrate 1, while step-transferring the TFT film substrate 1 and the CF film substrate 2, and then to successively mold the bonded body 5 into a curved shape, and divide the curved bonded body 5 into individual bonded bodies in the second processing unit 20a.

Respective tips of the pair of open/close gates 13 are preferably made of a nitrile rubber, a silicone rubber, a fluororubber, or the like. The pair of open/close gates 13 are configured to open and close according to the movement of the bonded body 5 so that the respective surfaces of the TFT film substrate 1 and the CF film substrate 2 of the bonded body 5 are nipped between the tips of the open/close gates 1.

As shown in FIG. 1, the first processing unit 10a includes: a lower bonding roll 11a and an upper bonding roll 11b provided as a pair of bonding rolls arranged to bond the TFT film substrate 1 and the CF film substrate 2 by passing the TFT film substrate 1 and the CF film substrate 2 therebetween; alignment cameras 12 arranged to detect each alignment mark on the TFT film substrate 1 and the CF film substrate 2 upon bonding; and a liquid crystal dispenser 4 to supply a liquid crystal material 4a to the TFT film substrate 1 before bonding. The first processing unit 10a is configured to be switchable between a vacuum atmosphere and an atmospheric atmosphere.

The lower bonding roll 11a and the upper bonding roll 11b are preferably made of aluminum or the like and have a cylindrical shape, for example.

The alignment cameras 12 are provided on both lateral sides of the upper bonding roll 11b, and are configured to detect each alignment mark formed on the TFT film substrate 1 and the CF film substrate 2, thereby controlling such as the respective rotation speeds of the lower bonding roll 11a and the upper bonding roll 11b to align the TFT film substrate 1 and the CF film substrate 2 so that their respective display regions D are superimposed on each other.

The liquid crystal dispenser 4 is filled with a deaerated liquid crystal material 4a, and is configured to drop a predetermined amount of liquid crystal material 4a to a region inside the frame-shaped sealant 3a formed in each display region D of the TFT film substrate 1.

The first processing unit 10a includes a pair of wind-off rolls (not shown) arranged to wind off the TFT film substrate 1 and the CF film substrate 2 wound up in a roll, respectively.

As shown in FIG. 1, the second processing unit 20a includes: a pressing plate 21 arranged to hold the bonded body 5 formed in the first processing unit 10a from underneath; a molding roll 25a arranged to hold the bonded body 5 pressed on the pressing plate 21 onto its peripheral wall and molding the bonded body 5; an ultraviolet (UV) lamp 26a provided as a light source to emit UV light to the bonded body 5 held on the peripheral wall of the molding roll 25a; a liquid crystal mask 24a so as to allow the UV light emitted from the UV lamp 26a to be applied to the sealants 3a and the peripheral seals 3 of the bonded body 5; a dividing cutter 28 arranged to divide the bonded body 5 molded by the molding roll 25a into individual bonded bodies 5 along the width direction; and a gripping unit 27 for gripping an individual bonded body 5 divided by the dividing cutter 28. The second processing unit 20a is configured to be switchable between a vacuum atmosphere and an atmospheric atmosphere.

The pressing plate 21 preferably has a plate shape of, for example, about 520 mm long by 620 mm wide so that a plurality of display regions D which form a molding unit can be placed thereon. Note that the panel size fabricated by each display region D is, for example, 2 inches to 30 inches.

Figure 2:
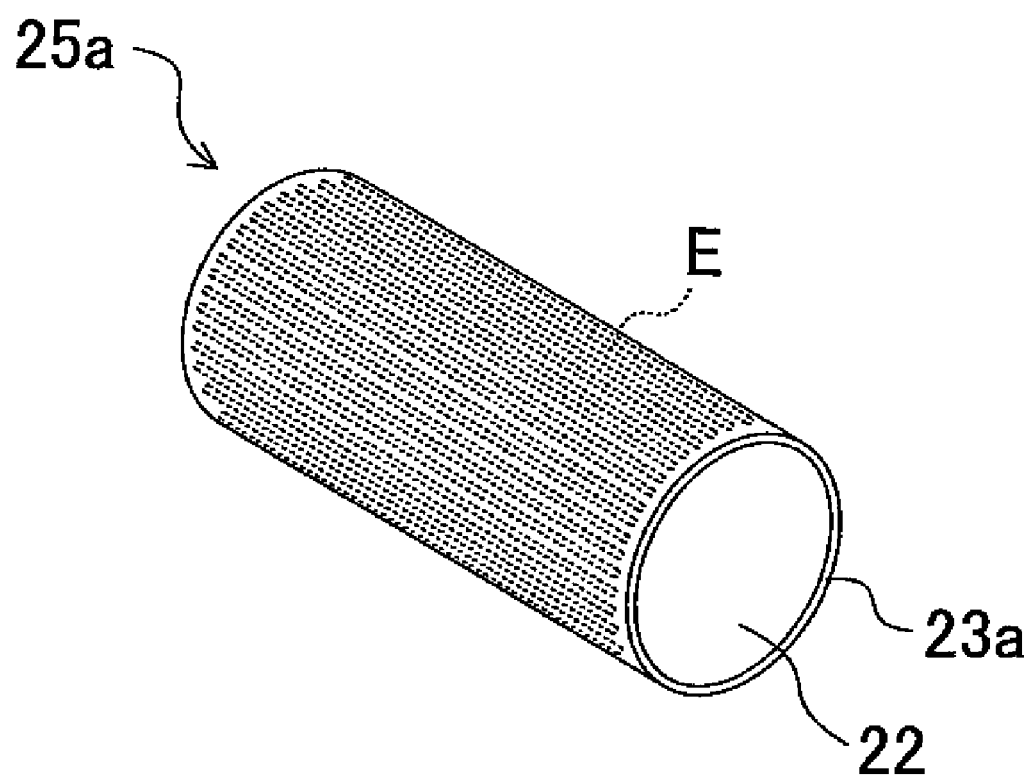

As shown in FIG. 2, the molding roll 25a includes a cylindrical roll main body 22 made of aluminum or the like, and an electrostatic chuck layer 23a arranged so as to cover a peripheral wall of the roll main body 22. The molding roll 25a has a radius of, for example, about 200 mm. Note that the peripheral wall of the roll main body 22 is matte black by a black alumite treatment, and the peripheral wall of the roll main body 22 and the electrostatic chuck layer 23a formed thereon serve as a reflection suppressing film for suppressing reflection of UV light emitted from the UV lamp 26a.

As shown in FIG. 2, the electrostatic chuck layer 23a is a dielectric layer having a plurality of electrode patterns E formed inside so as to extend parallel to each other along the width direction of the roll main body 22.

Figure 3:
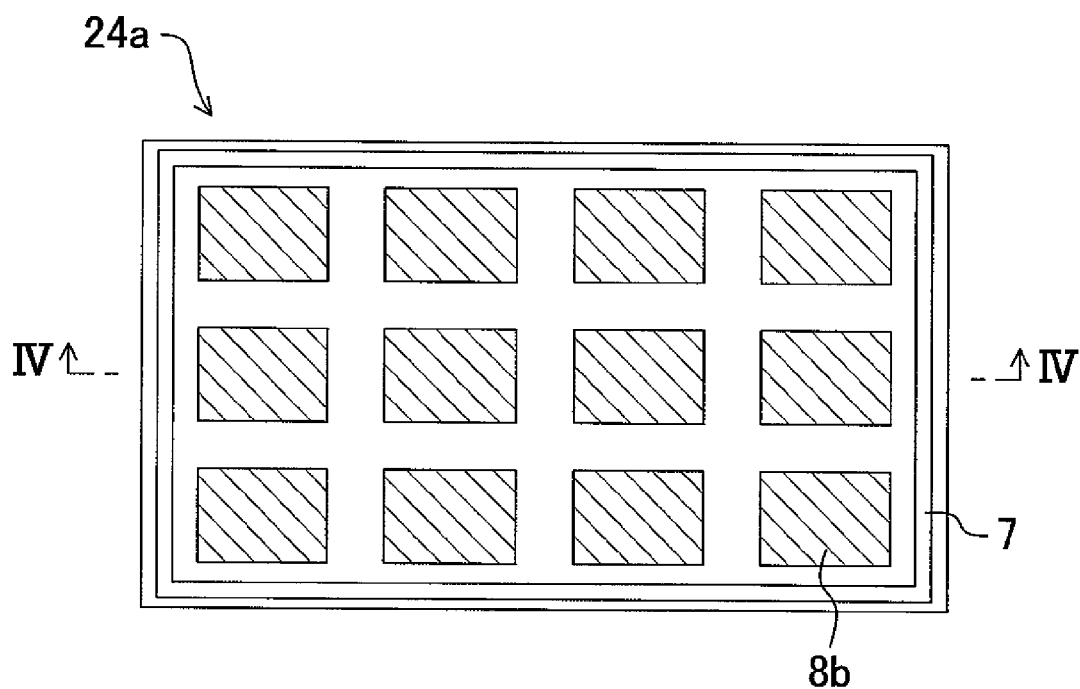
Figure 4:
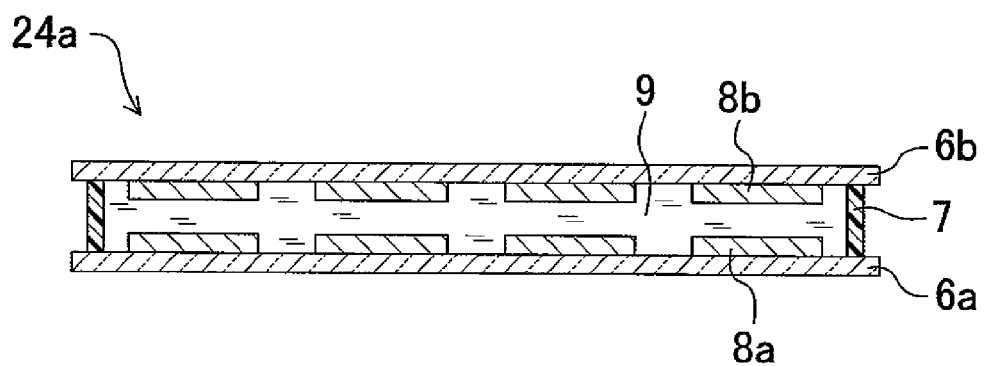
FIG. 4 is a cross-sectional view of the liquid crystal mask 24a taken along line IV-IV in FIG. 3.

As shown in FIGS. 3 and 4, the liquid crystal mask 24a includes: a pair of glass substrates 6a, 6b each having a plurality of transparent electrodes 8a, 8b arranged in a matrix pattern; a frame-shaped sealant 7 provided between the pair of glass substrates 6a, 6b; and a liquid crystal layer 9 enclosed inside the sealant 7 between the pair of glass substrates 6a, 6b. According to the movement of the bonded body 5 held on the peripheral wall of the molding roll 25a, the liquid crystal mask 24a applies a voltage between the transparent electrodes 8a, 8b as appropriate to move a light-shielding region formed by the liquid crystal layer 9, thereby allowing UV light from the UV lamp 26a to be applied to the sealants 3a and the peripheral seals 3 of the bonded body 5 while shielding the liquid crystal material 4a from the UV light. FIG. 3 is a top view of the liquid crystal mask 24a, and FIG. 4 is a cross-sectional view of the liquid crystal mask 24a taken along line IV-IV in FIG. 3.

Figure 6:
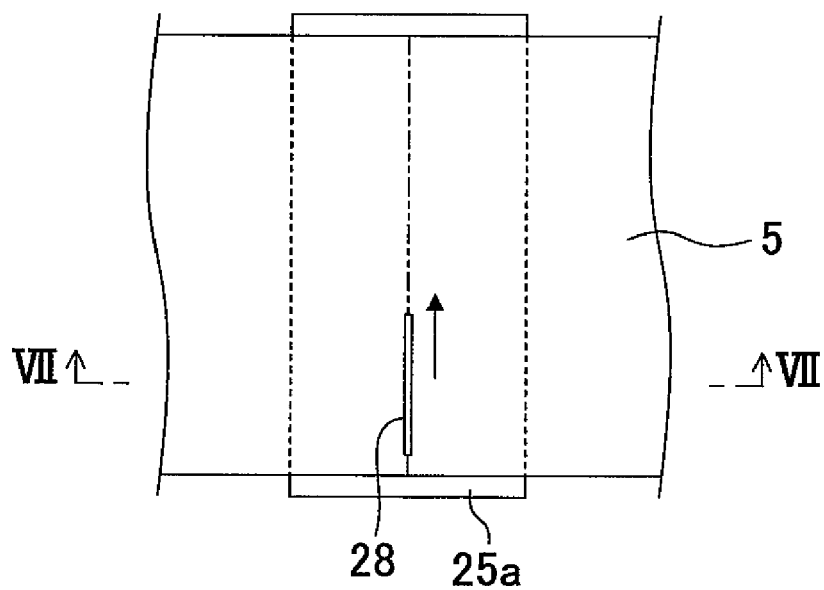
Figure 7:
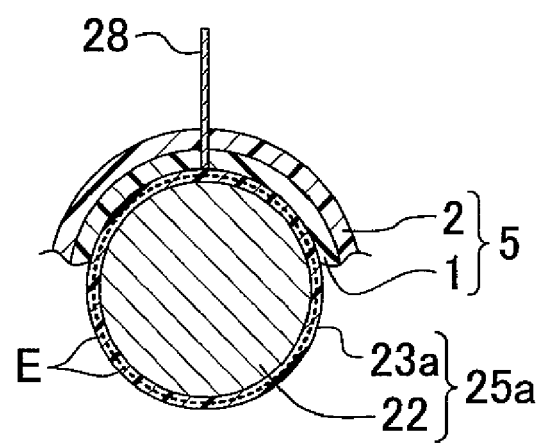
FIG. 7 is a cross-sectional view of the region around the dividing cutter 28 taken along line VII-VII in FIG. 6.

The dividing cutter 28 is a disc-shaped blade. As shown in FIGS. 6 and 7, the dividing cutter 28 is configured to divide the bonded body 5, for example, into a plurality of display regions D, each forming a molding unit, by rolling in contact with the bonded body 5 held on the peripheral wall of the molding roll 25a. FIG. 6 is a top view of a region around the dividing cutter 28, and FIG. 7 is a cross-sectional view of the region around the dividing cutter 28 taken along line VII-VII in FIG. 6. Note that the dividing cutter 28 is not limited to such a disc-shaped blade as described above, but may be a guillotine blade or the like.

As shown in FIG. 1, the gripping unit 27 includes a gripping unit main body 27a having a concave surface with a curvature corresponding to the bonded body 5 molded by the molding roll 25a, and an electrostatic chuck layer 27b provided on the concave surface of the gripping unit main body 27a. The gripping unit 27 is configured to grip the individual bonded body 5 divided by the dividing cutter 28 by electrostatic force to remove the individual bonded body 5 from the molding roll 25*a*.

Each film substrate which is continuously processed in the LCD panel manufacturing apparatus 30*a* of the above structure will be described below.

Figure 5:
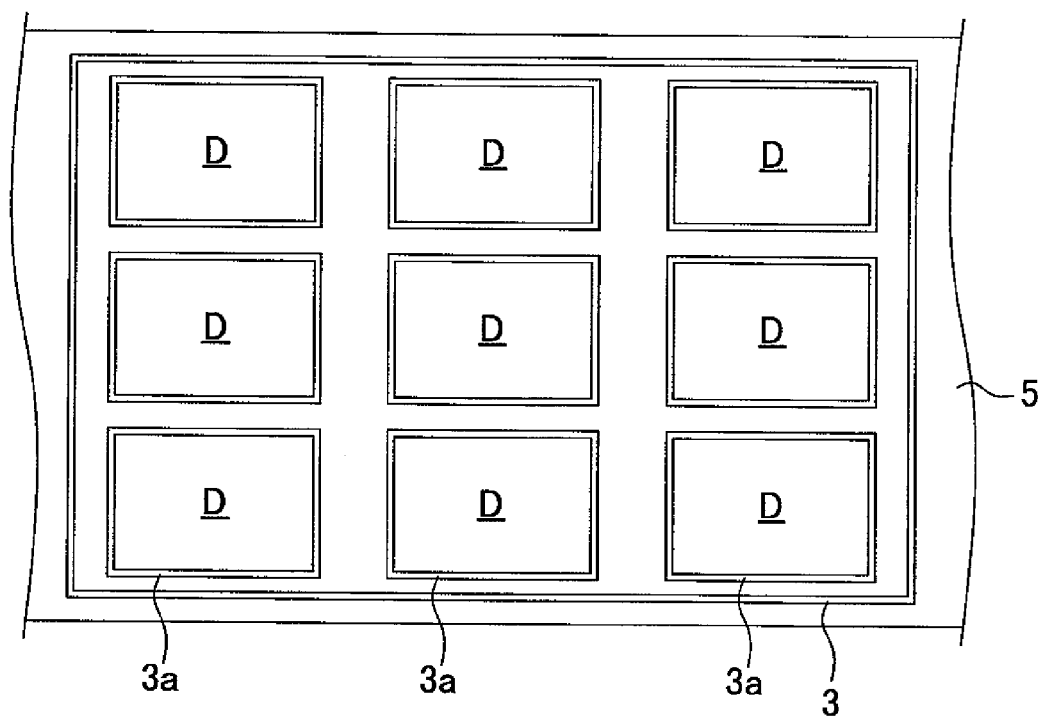

A plurality of display regions D are defined in a matrix pattern along the longitudinal direction and the width direction in the TFT film substrate 1 and the CF film substrate 2 (see FIG. 5).

Each display region D of the TFT film substrate 1 includes, for example, a plurality of gate lines extending parallel to each other, a plurality of source lines extending parallel to each other in a direction perpendicular to the gate lines, a plurality of TFTs provided at each intersection of the gate lines and the source lines as switching devices, and a plurality of pixel electrodes provided respectively corresponding to the TFTs. Thus, each display region D of the TFT film substrate 1 has a structure of a so-called active matrix substrate.

Each display region D of the CF film substrate 2 includes, for example, a color filter having R, G, and B colored layers corresponding to each pixel electrode on the TFT film substrate 1, and a common electrode provided so as to cover the color filter. Thus, each display region D of the CF film substrate 2 has a structure of a so-called counter substrate.

Moreover, a frame-shaped sealant 3*a* is provided on each display region D of the TFT film substrate 1, and a frame-shaped peripheral seal 3 is provided on the TFT film substrate 1 so as to surround a plurality of sealants 3*a* of one molding unit (see FIG. 5).

A method for manufacturing an LCD panel by using the LCD panel manufacturing apparatus 30*a* of the above structure will be described below. Note that the manufacturing method of the present preferred embodiment includes a film substrate fabricating step, a seal forming step, a liquid crystal supplying step, a bonding step, a molding step, and a dividing step.

Film Substrate Fabricating Step

TFTs, pixel electrodes, and the like are patterned by a roll-to-roll method or the like on, for example, a plastic film of about 500 mm wide, about 50 m long, and about 50 µm to about 100 µm thick to form a plurality of active element layers along the longitudinal direction and the width direction. Then, an alignment film is formed on a surface of the resultant substrate, thereby fabricating a TFT film substrate 1 having a plurality of display regions D defined in a matrix pattern.

Moreover, a color filter, a common electrode, and the like are patterned by a roll-to-roll method or the like on, for example, a plastic film of about 500 mm wide, about 50 m long, and about 50 µm to about 100 µm thick to form a plurality of CF element layers along the longitudinal direction and the width direction. Then, an alignment film is formed on a surface of the resultant substrate, thereby fabricating a CF film substrate 2 having a plurality of display regions D defined in a matrix pattern. Note that the thickness of the plastic film may be different between the TFT film substrate 1 and the CF film substrate 2.

Seal Forming Step

For example, a UV-curable epoxy resin or the like is drawn or printed by a roll-to-roll method or the like on the TFT film substrate 1 fabricated in the film substrate fabricating step. Thus, a sealant 3*a* is formed in every display region D, and a peripheral seal 3 is formed in every plurality of display regions D which form a molding unit.

Liquid Crystal Supplying Step

First, the TFT film substrate 1 having the sealants 3*a* and the peripheral seals 3 formed in the seal forming step, and the CF film substrate 2 fabricated in the film substrate fabricating step are wound up in a roll form, and attached to respective wind-off rolls (not shown) provided in the first processing unit 10*a*. Then, the first processing unit 10*a* and the second processing unit 20*a* are set to a vacuum atmosphere.

Then, the TFT film substrate 1 is wound off from the wind-off roll, and as shown in FIG. 1, the liquid crystal material 4*a* is dropped from the liquid crystal dispenser 4 to a region inside each sealant 3*a* of the TFT film substrate 1.

Bonding Step

First, the TFT film substrate 1 having the liquid crystal material 4*a* dropped thereon in the liquid crystal supplying step, and the CF film substrate 2 wound off from the wind-off roll are aligned by the alignment cameras 12 so that the respective display regions D are superimposed on each other. Then, the TFT film substrate 1 and the CF film substrate 2 are bonded to form a bonded body 5.

Next, after the bonded body 5 thus formed is step-transferred into the second processing unit 20*a*, the pair of open/close gates 13 are closed, and the second processing unit 20*a* is set to an atmospheric atmosphere. Thus, the respective surfaces of the TFT film substrate 1 and the CF film substrate 2 of the bonded body 5 are pressed on the pressing plate 21 to compress the sealants 3*a* and the peripheral seals 3 to a predetermined thickness.

Molding Step

First, the bonded body 5 pressed in the bonding step is step-transferred so as to be held onto the peripheral wall of the molding roll 25*a*.

Then, UV light is emitted from the UV lamp 26*a* through the liquid crystal mask 24*a* to the sealants 3*a* and the peripheral seals 3 of the bonded body 5 held on the peripheral wall of the molding roll 25*a*, thereby curing the sealants 3*a* and the peripheral seals 3. The bonded body 5 is thus molded into a curved shape along the peripheral wall of the molding roll 25*a*.

Dividing Step

First, while holding the bonded body 5 molded in the molding step onto the molding roll 25*a*, the molding roll 25*a* is rotated by an amount corresponding to one molding unit. Then, as shown in FIGS. 6 and 7, the dividing cutter 28 is rolled in contact with the bonded body 5 on the peripheral wall of the molding roll 25*a* to divide the bonded body 5 into molding units along the width direction.

Next, a divided individual bonded body 5 on the peripheral wall of the molding roll 25*a* is gripped by the gripping unit 27 to remove the individual bonded body 5 from the molding roll 25*a*.

Figure 8:
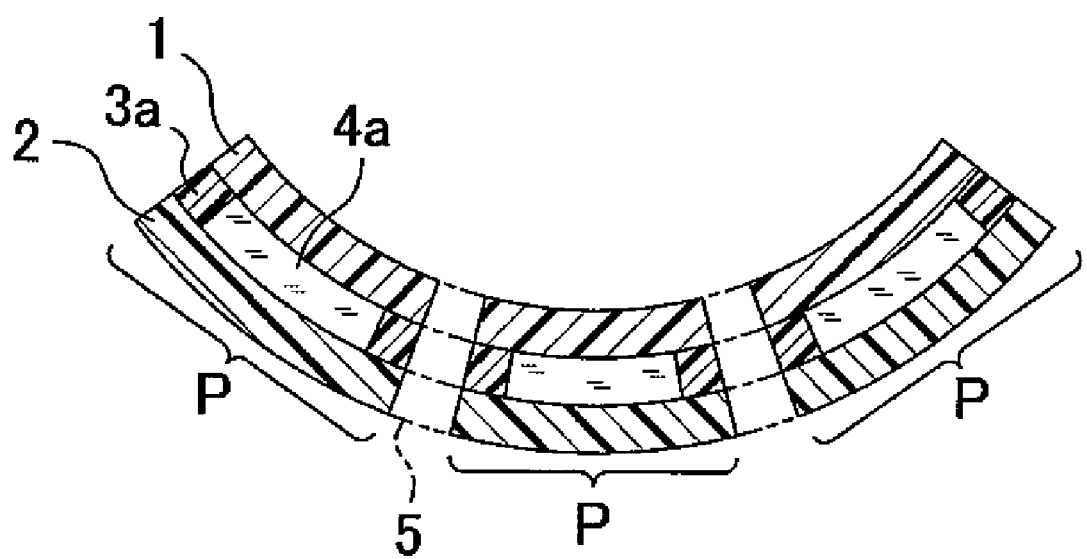

Then, the individual bonded body 5 divided into a molding unit is carried out of the second processing unit 20*a*, and is divided into display regions D (see FIG. 8).

A curved LCD panel P (e.g., a radius of curvature: 200 mm) can be manufactured in this manner.

As described above, according to the apparatus (30*a*) and the method for manufacturing the LCD panel P of the present preferred embodiment, the curved LCD panel P can be manufactured by: first successively bonding the TFT film substrate 1 and the CF film substrate 2 through the sealants 3*a* and the peripheral seals 3 along the longitudinal direction to form the bonded body 5 in the first processing unit 10*a* for performing the bonding step; and then molding the bonded body 5 into a curved shape by the molding roll 25*a* in the second processing unit 20*a* for performing the molding step. In the second processing unit 20*a*, the sealants 3*a* and the peripheral seals 3 are cured while holding the bonded body 5 formed in the first processing unit 10*a* on the peripheral wall of the molding roll 25*a*. This enables the bonded body 5 to be continuously molded along the longitudinal direction, thereby achieving higher productivity, and eliminating the need for multiple sets of pressing jigs such as male and female molds. Thus, the manufacturing cost and the apparatus cost for manufacturing a curved LCD panel can be reduced as much as possible.

Moreover, the plurality of electrode patterns E extending in parallel are provided in the peripheral wall of the molding roll 25a of the present preferred embodiment. Thus, applying a voltage between a selected electrode pattern E and the bonded body 5 enables Coulomb force to be generated on the peripheral wall of the molding roll 25a through that electrode pattern E, whereby the bonded body 5 can be attached to, or detached from, the peripheral wall of the molding roll 25a as appropriate.

The reflection suppressing film (23a) to suppress reflection of UV light emitted from the UV lamp 26a is provided in the peripheral wall of the molding roll 25a of the present preferred embodiment. This reflection suppressing film (23a) prevents the UV light from the UV lamp 26a from reflecting from the peripheral wall of the molding roll 25a into, for example, the liquid crystal material 4a enclosed between the TFT film substrate 1 and the CF film substrate 2 through the sealants 3a. This prevents degradation of the liquid crystal material 4a.

Moreover, according to the manufacturing method of the present preferred embodiment, a frame-shaped sealant 3a is first formed on each display region D of the TFT film substrate 1 in the seal forming step, and then the liquid crystal material 4a is supplied to a region inside each sealant 3a of the TFT film substrate 1 under a vacuum atmosphere in the liquid crystal supplying step. Thereafter, the bonded body 5 is formed in the bonding step by bonding the TFT film substrate 1, having the liquid crystal material 4a supplied thereto, and the CF film substrate 2 by the sealants 3a and the peripheral seals 3. Then, by returning the bonded body 5 to an atmospheric pressure atmosphere, a pressure difference is generated in the bonded body 5 between the inside and outside of each frame-shaped peripheral seal 3 formed in the seal forming step. Since the respective surfaces of the TFT film substrate 1 and the CF film substrate 2 of the bonded body 5 are pressed so as to reduce the pressure difference, a more productive ODF method than a conventional dip injection method can be implemented. Note that although a peripheral seal 3 is formed outside a plurality of sealants 3a formed on the TFT film substrate 1, the peripheral seal 3 may be omitted.

Second Preferred Embodiment

Figure 9:
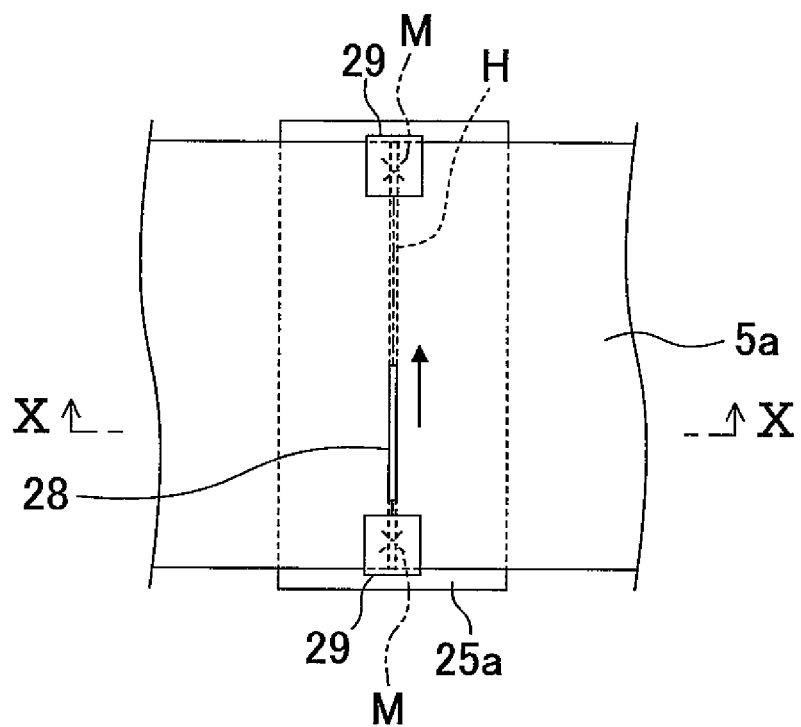
FIG. 9 is a top view illustrating a dividing step of dividing a bonded body 5a according to a second preferred embodiment of the present invention.
Figure 10:
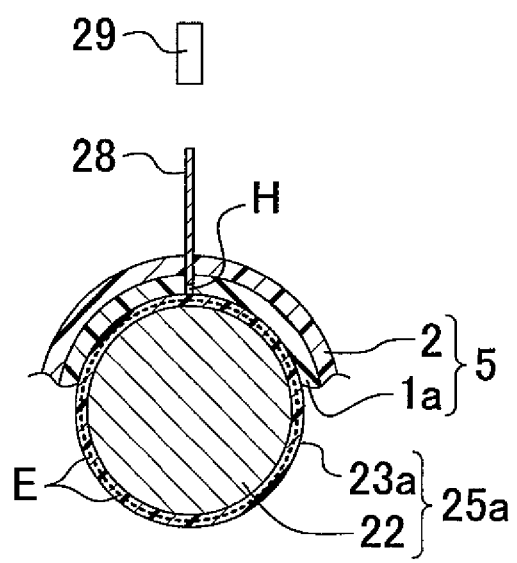
FIG. 10 is a cross-sectional view of a region around the dividing cutter 28 taken along line X-X in FIG. 9.

FIGS. 9 and 10 show a second preferred embodiment of the present invention. Note that, in the following preferred embodiments, the same elements as those of FIGS. 1 through 8 are denoted with the same reference numerals and characters as those of FIGS. 1 through 8, and detailed description thereof will be omitted.

The plastic film of the TFT film substrate 1 is an unprocessed film in the first preferred embodiment. In the present preferred embodiment, a half-cut groove H is formed along the width direction in every molding unit in the bottom surface of a plastic film of a TFT film substrate 1a.

A method for manufacturing an LCD panel using the TFT film substrate 1a will be described below with reference to FIGS. 9 and 10 mainly with respect to the differences from the manufacturing method described in the first preferred embodiment. FIG. 9 is a top view illustrating a dividing step of dividing a bonded body 5a of the present preferred embodiment, and FIG. 10 is a cross-sectional view of a region around the dividing cutter 28 taken along line X-X in FIG. 9. Note that the manufacturing method of the present preferred embodiment includes a film substrate fabricating step (including a half-cut step), a seal forming step, a liquid crystal supplying step, a bonding step, a molding step, and a dividing step.

Film Substrate Fabricating Step

A half-cut groove H extending along the width direction is formed, in every plurality of display regions D which form one molding unit, in the bottom surface of the TFT film substrate 1 fabricated in the first preferred embodiment (the half-cut step), thereby fabricating a TFT film substrate 1a.

Since the seal forming step and the liquid crystal supplying step, which follow the film substrate fabricating step, are similar to those of the first preferred embodiment, description thereof will be omitted.

Bonding Step

First, the TFT film substrate 1a having the liquid crystal material 4a dropped thereon in the liquid crystal supplying step, and the CF film substrate 2 wound off from a wind-off roll are aligned by the alignment cameras 12 so that the respective display regions D are superimposed on each other. Then, the TFT film substrate 1a and the CF film substrate 2 are bonded to form a bonded body 5a. Note that the grooves H formed in the half-cut step face outward in the bonded body 5a.

Then, after the bonded body 5a thus formed is step-transferred into the second processing unit 20a, the pair of open/close gates 13 are closed, and the second processing unit 20a is set to an atmospheric atmosphere. Thus, the respective surfaces of the TFT film substrate 1a and the CF film substrate 2 of the bonded body 5a are pressed on a pressing plate 21 to compress the sealants 3a and the peripheral seals 3 to a predetermined thickness.

Forming Step

First, the bonded body 5a pressed in the bonding step is step-transferred so as to be held onto the peripheral wall of the molding roll 25a. Note that the bonded body 5a is held onto the peripheral wall of the molding roll 25a from the TFT film substrate 1a side.

Then, UV light is emitted from the UV lamp 26a through the liquid crystal mask 24a to the sealants 3a and the peripheral seals 3 of the bonded body 5a held on the peripheral wall of the molding roll 25a, thereby curing the sealants 3a and the peripheral seals 3. The bonded body 5a is thus molded into a curved shape along the peripheral wall of the molding roll 25a.

Dividing Step

First, while holding the bonded body 5a molded in the molding step onto the molding roll 25a, the molding roll 25a is rotated by an amount corresponding to one molding unit. Then, as shown in FIGS. 9 and 10, alignment marks M formed on at least one of the TFT film substrate 1a and the CF film substrate 2 are detected by alignment cameras 29 to align the bonded body 5a and the diving cutter 28 so that the position of the groove H formed in the back surface of the TFT film substrate 1a matches the traveling line of the dividing cutter 28.

The dividing cutter 28 is then rolled in contact with the bonded body 5a on the peripheral wall of the molding roll 25a to divide the bonded body 5a into molding units along the width direction.

Moreover, a divided individual bonded body 5a on the peripheral wall of the molding roll 25a is gripped by the gripping unit 27 to remove the individual bonded body 5a from the molding roll 25a. Then, the individual bonded body 5a divided into a molding unit is carried out of the second processing unit 20a, and is divided into display regions D. A curved LCD panel can be manufactured in this manner.

According to the manufacturing method of the LCD panel of the present preferred embodiment, the half-cut groove H extending in the width direction is formed in the TFT film substrate 1 in the half-cut step, whereby the TFT film substrate 1a is fabricated. Then, the bonded body 5a formed in the bonding step is molded in the molding step while holding the bonded body 5a onto the peripheral wall of the molding roll 25a so that the groove H faces the molding roll 25a. In the dividing step, the bonded body 5a held on the peripheral wall of the molding roll 25a is divided into a plurality of display regions D, each forming a molding unit, by bringing the dividing cutter 28 into contact with the bonded body 5a held on the peripheral wall of the molding roll 25a. More specifically, the bonded body 5a held on the peripheral wall of the molding roll 25a is divided into a plurality of display regions D by bringing the dividing cutter 28 in contact with the upper film substrate, that is, the CF film substrate 2, entirely in the thickness direction over the peripheral wall of the molding roll 25a, while bringing the dividing cutter 28 into contact with an upper portion of the lower film substrate, i.e., an upper portion of the TFT film substrate 1a, in the thickness direction, that is, bringing the dividing cutter 28 into contact with the bottom of the groove H located away from the peripheral wall of the molding roll 25a. Thus, the bonded body 5a is divided into a plurality of display regions D without making the dividing cutter 28 in contact with the peripheral wall of the molding roll 25a, thereby suppressing damages to the peripheral wall of the molding roll 25a by the dividing cutter 28.

Note that the present preferred embodiment shows an example of the manufacturing method in which the TFT film substrate 1a is fabricated by forming the half-cut grooves H in the fabricated TFT film substrate 1. However, the TFT film substrate 1a may be fabricated by forming an active element layer and the like on a plastic film having half-cut grooves formed in advance. Alternatively, half-cut grooves may be formed in the bonded body 5 of the TFT film substrate 1 and the CF film substrate 2.

Third Preferred Embodiment

Figure 11:
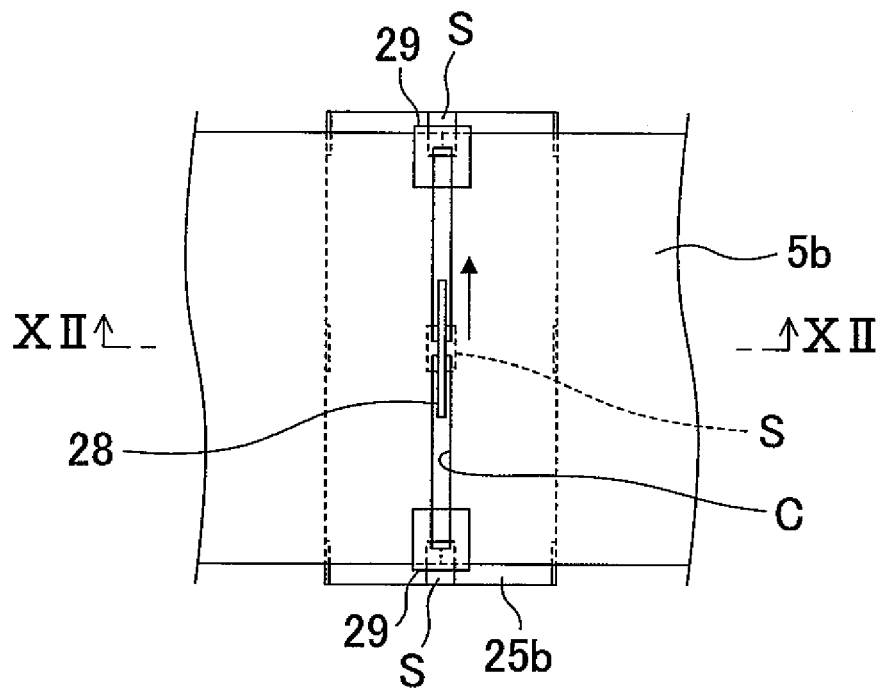
FIG. 11 is a top view illustrating a dividing step of dividing a bonded body 5b according to a third preferred embodiment of the present invention.
Figure 12:
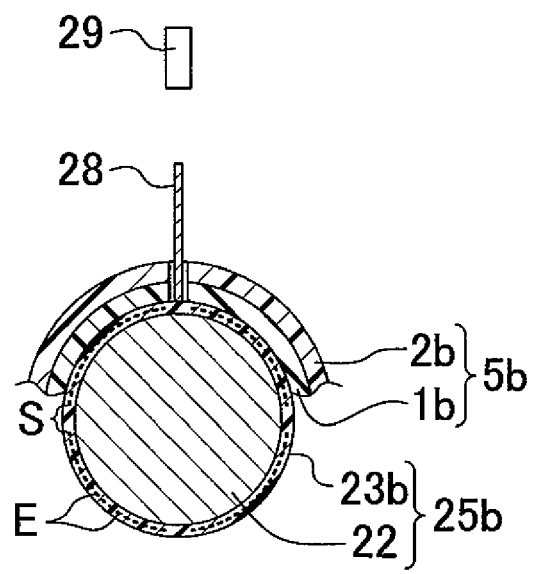
FIG. 12 is a cross-sectional view of a region around the dividing cutter 28 taken along line XII-XII in FIG. 11.

FIGS. 11 and 12 show a third preferred embodiment of the present invention. FIG. 11 is a top view illustrating a dividing step of dividing a bonded body 5b of the present preferred embodiment, and FIG. 12 is a cross-sectional view of a region around the dividing cutter 28 taken along line XII-XII in FIG. 11.

In the second preferred embodiment, the half-cut grooves H are formed in the bottom surface of the TFT film substrate 1a of the bonded body 5a in order to prevent any damage to the peripheral wall of the molding roll 25a. In the present preferred embodiment, as shown in FIG. 11, cut-outs C extending along the width direction are formed in a TFT film substrate 1b and a CF film substrate 2b of a bonded body 5b, and electrode patterns E in an electrostatic chuck layer 23b provided in a peripheral wall of a molding roll 25b have slit regions S formed at positions corresponding to the cut-outs C of the bonded body 5b. More specifically, in the bonded body 5b of the present preferred embodiment, the TFT film substrate 1b and the CF film substrate 2b are connected to each other at both ends and the middle along the width direction in every plurality of display regions D forming a molding unit, and the cut-outs C are formed therebetween.

A method for manufacturing an LCD panel using the bonded body 5b and the molding roll 25b will be described below mainly with respect to the differences from the manufacturing method described in the first preferred embodiment. Note that the manufacturing method of the present preferred embodiment includes a film substrate fabricating step, a seal forming step, a liquid crystal supplying step, a bonding step, a cut-out forming step, a molding step, and a dividing step. Since the film substrate fabricating step, the seal forming step, the liquid crystal supplying step, and the bonding step are similar to those of the first preferred embodiment, description thereof will be omitted.

Cut-Out Forming Step

The bonded body 5 pressed in the bonding step is subjected to laser processing, punching processing, or the like by a roll-to-roll method to pattern the cut-outs C, whereby the bonded body 5b is formed.

Molding Step

First, the bonded body 5b formed in the cut-out forming step is step-transferred and held onto the peripheral wall of the molding roll 25b so that the cut-outs C of the bonded body 5b and the slit regions S of the electrode pattern E in the molding roll 25b are positioned in line (see FIG. 11).

Then, UV light is emitted from the UV lamp 26a through the liquid crystal mask 24a to the sealants 3a and the peripheral seals 3 of the bonded body 5b held on the peripheral wall of the molding roll 25b, thereby curing the sealants 3a and the peripheral seals 3. The bonded body 5b is thus molded into a curved shape along the peripheral wall of the molding roll 25b.

Dividing Step

First, while holding the bonded body 5b molded in the molding step onto the molding roll 25b, the molding roll 25b is rotated by an amount corresponding to one molding unit. Then, as shown in FIGS. 11 and 12, alignment marks (not shown) formed on at least one of the TFT film substrate 1b and the CF film substrate 2b are detected by the alignment cameras 29 to align the bonded body 5b and the diving cutter 28 so that the position of the cut-outs C in the bonded body 5b, that is, the position of each joint portion of the bonded body 5b, matches the traveling line of the dividing cutter 28.

The dividing cutter 28 is then slightly rolled in contact with each joint portion of the bonded body 5b on the peripheral wall of the molding roll 25b to divide the bonded body 5b into molding units along the width direction.

Moreover, a divided individual bonded body 5b on the peripheral wall of the molding roll 25b is gripped by the gripping unit 27 to remove the individual bonded body 5b from the molding roll 25b. Then, the individual bonded body 5b divided into a molding unit is carried out of the second processing unit 20a, and is divided into display regions D. A curved LCD panel can be manufactured in this manner.

According to the manufacturing method of the LCD panel of the present preferred embodiment, the electrode patterns E formed in the peripheral wall of the molding roll 25b have the slit regions S at predetermined positions. Thus, when the bonded body 5b is divided into a plurality of display regions D (i.e., into molding units) by making the dividing cutter 28 in contact with the bonded body 5b on the peripheral wall of the molding roll 25b, the dividing cutter 28 is in contact with the position of the slit regions S in the electrode pattern E. This prevents any damage to the electrode patterns E by the dividing cutter 28.

Note that the present preferred embodiment shows an example of the manufacturing method in which the cut-outs C are formed in the bonded body 5 after the TFT film substrate 1 and the CF film substrate 2 are bonded into the bonded body 5. However, the TFT film substrate 1b and the CF film substrate 2b may be fabricated by, for example, respectively forming an active element layer and a CF element layer on a pair of plastic films having cut-outs formed in advance.

Fourth Preferred Embodiment

Figure 13:
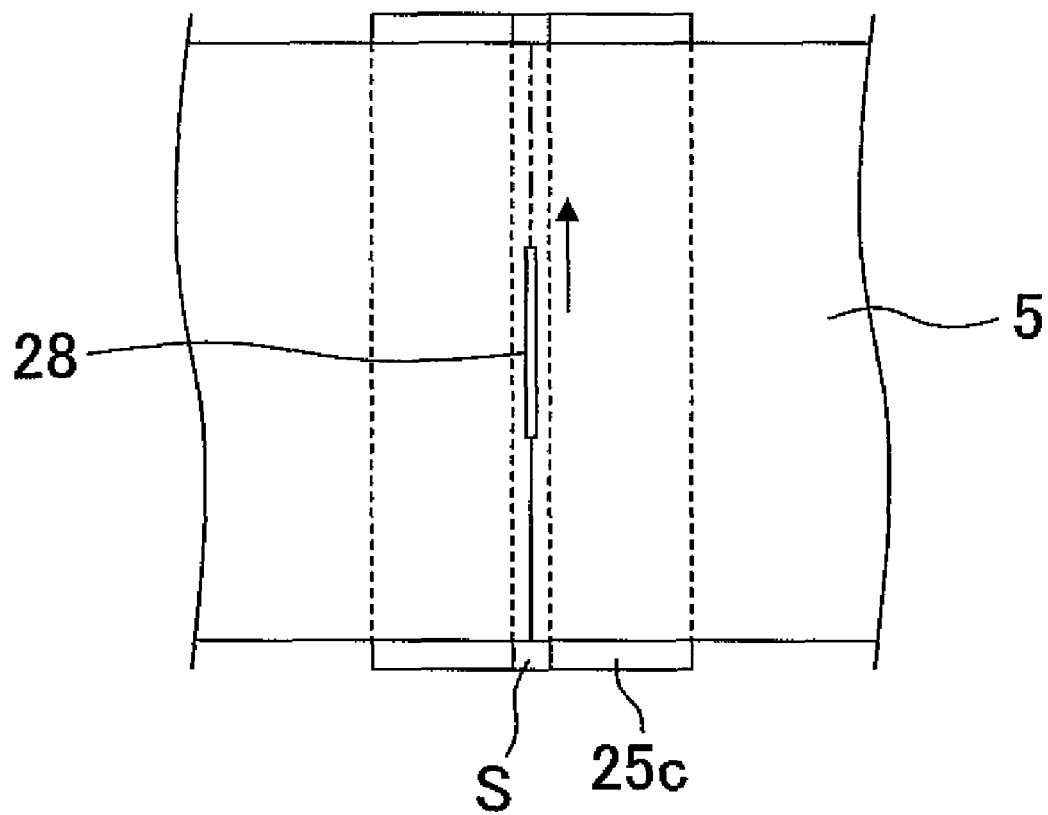
FIG. 13 is a top view illustrating a dividing step of dividing a bonded body 5 according to a fourth preferred embodiment of the present invention.

FIG. 13 is a top view illustrating a dividing step of dividing a bonded body 5 of the present preferred embodiment. Note that the cross-sectional view of a region around the dividing cutter 28 in FIG. 13 is substantially the same as FIG. 12.

In the third preferred embodiment, the electrode patterns E in the electrostatic chuck layer 23*b* provided in the peripheral wall of the molding roll 25*b* has the slit regions S formed at the positions corresponding to each joint portion of the bonded body 5*b* in order to prevent damage to the peripheral wall of the molding roll 25*b*. In the present preferred embodiment, electrode patterns (E) in an electrostatic chuck layer (23*b*) provided in a peripheral wall of a molding roll 25*c* have slit regions S extending along the width direction.

A method for manufacturing an LCD panel using the bonded body 5 and the molding roll 25*c* will be described below mainly with respect to the differences from the manufacturing method described in the first preferred embodiment. Note that the manufacturing method of the present preferred embodiment includes a film substrate fabricating step, a seal forming step, a liquid crystal supplying step, a bonding step, a molding step, and a dividing step. Since the film substrate fabricating step, the seal forming step, the liquid crystal supplying step, and the bonding step are similar to those of the first preferred embodiment, description thereof will be omitted.

Molding Step

First, the bonded body 5 pressed in the bonding step is step-transferred and held onto the peripheral wall of the molding roll 25*c* so that a dividing region of the bonded body 5 and a slit region S of the molding roll 25*c* are superimposed on each other. The dividing region of the bonded body 5 is a region located outside a plurality of display regions D which form a molding unit.

Then, UV light is emitted from the UV lamp 26*a* through the liquid crystal mask 24*a* to the sealants 3*a* and the peripheral seals 3 of the bonded body 5 held on the peripheral wall of the molding roll 25*c*, thereby curing the sealants 3*a* and the peripheral seals 3. The bonded body 5 is thus molded into a curved shape along the peripheral wall of the molding roll 25*c*.

Dividing Step

First, while holding the bonded body 5 molded in the molding step onto the molding roll 25*c*, the molding roll 25*c* is rotated by an amount corresponding to one molding unit. Then, as shown in FIG. 13, the bonded body 5 and the diving cutter 28 are aligned so that the slit region S of the molding roll 25*c* matches the traveling line of the dividing cutter 28.

The dividing cutter 28 is then rolled in contact with the bonded body 5 on the peripheral wall of the molding roll 25*c* to divide the bonded body 5 into molding units along the width direction.

Moreover, a divided individual bonded body 5 on the peripheral wall of the molding roll 25*c* is gripped by the gripping unit 27 to remove the individual bonded body 5 from the molding roll 25*c*. Then, the individual bonded body 5 divided into a molding unit is carried out of the second processing unit 20*a*, and is divided into display regions D. A curved LCD panel can be manufactured in this manner.

According to the manufacturing method of the LCD panel of the present preferred embodiment, the electrode patterns (E) formed in the peripheral wall of the molding roll 25*c* have the slit regions S at predetermined positions, as in the case of the third preferred embodiment. This structure prevents any damages to the electrode patterns E by the dividing cutter 28. Moreover, it is not necessary to form the cut-outs C in the bonded body 5*b* as in the case of the third preferred embodiment. Thus, damages to the electrode patterns E by the dividing cutter 28 can be more easily prevented as compared to the third preferred embodiment.

Fifth Preferred Embodiment

Figure 14:
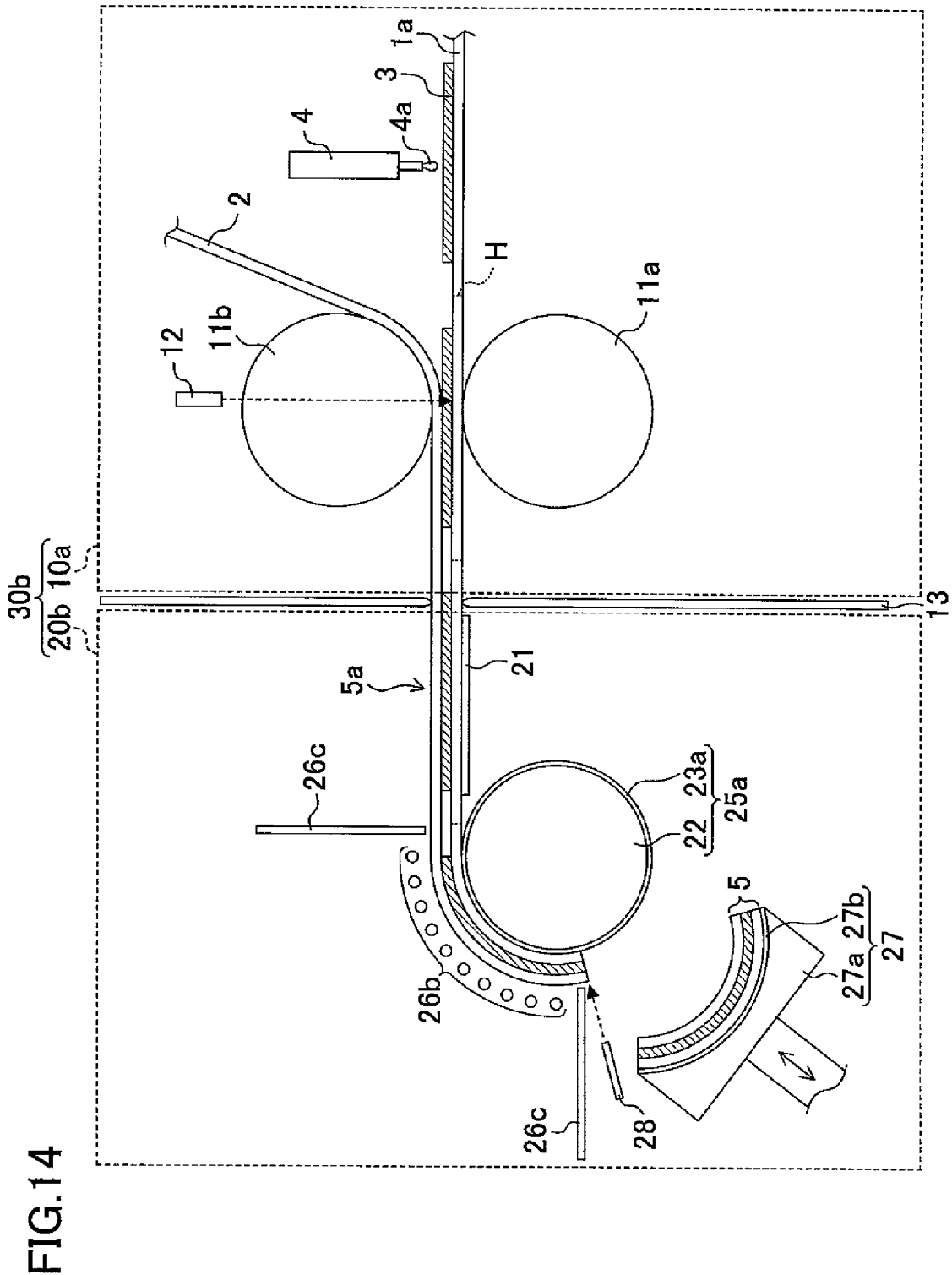
FIG. 14 is a side view of an LCD panel manufacturing apparatus 30b according to a fifth preferred embodiment of the present invention.

FIG. 14 is a side view of an LCD panel manufacturing apparatus 30*b* of the present preferred embodiment.

As shown in FIG. 14, the LCD panel manufacturing apparatus 30*b* includes a first processing unit 10*a* and a second processing unit 20*b* which are connected to each other through a pair of open/close gates 13. Note that the first processing unit 10*a* is substantially the same as that of the first preferred embodiment.

As shown in FIG. 14, the second processing unit 20*b* includes: a pressing plate 21 arranged to hold a bonded body 5*a* formed in the first processing unit 10*a* from underneath; a molding roll 25*a* arranged to hold the bonded body 5*a* pressed on the pressing plate 21 onto the peripheral wall thereof, and molding the bonded body 5*a*; an infrared heater 26*b* provided as a heat source to heat the bonded body 5*a* held on the peripheral wall of the molding roll 25*a*; a thermal insulating wall 26*c* provided around the infrared heater 26*b*; a dividing cutter 28 arranged to divide the bonded body 5*a* molded by the molding roll 25*a* along the width direction; and a gripping unit 27 arranged to grip an individual bonded body 5 (5*a*) divided by the dividing cutter 28. The second processing unit 20*b* is configured to be switchable between a vacuum atmosphere and an atmospheric atmosphere.

The infrared heater 26*b* is configured so that its temperature can be controlled to about 200° C. or less, for example, in order to prevent degradation of a liquid crystal material 4*a* enclosed in the bonded body 5*a*.

A method for manufacturing an LCD panel by using the LCD panel manufacturing apparatus 30*b* of the above structure will be described below. Note that the manufacturing method of the present preferred embodiment preferably includes a film substrate fabricating step, a seal forming step, a liquid crystal supplying step, a bonding step, a molding step, and a dividing step. Since the film substrate fabricating step, the liquid crystal supplying step, the bonding step, and the dividing step are similar to those of the second preferred embodiment, description thereof will be omitted.

Seal Forming Step

For example, a thermosetting epoxy resin or the like is drawn or printed by a roll-to-roll method or the like on a TFT film substrate 1*a* fabricated in the film substrate fabricating step. Thus, a sealant 3*a* is formed in every display region D, and a peripheral seal 3 is formed in every plurality of display regions D which form one molding unit.

Molding Step

First, the bonded body 5*a* pressed in the bonding step is step-transferred and held onto the peripheral wall of the molding roll 25*a*.

Then, the bonded body 5*a* held on the peripheral wall of the molding roll 25*a* is heated by the infrared heater 26*b* to cure the sealants 3*a* and the peripheral seals 3. The bonded body 5*a* is thus molded into a curved shape along the peripheral wall of the molding roll 25*a*.

Then, the dividing step is performed, whereby a curved LCD panel can be manufactured.

According to the manufacturing method of the LCD panel of the present preferred embodiment, it is not necessary to use the liquid crystal mask 24*a* like the first preferred embodiment in the molding step. This facilitates curing of the sealants 3*a* and the peripheral seals 3 of the bonded body 5*a*.

According to the manufacturing method of the LCD panel of the present preferred embodiment, half-cut grooves H are formed in the bottom surface of the TFT film substrate 2 as in the case of the second preferred embodiment. This prevents damage to the peripheral wall of the molding roll 25*a* by the dividing cutter 28.

Sixth Preferred Embodiment

Figure 15:
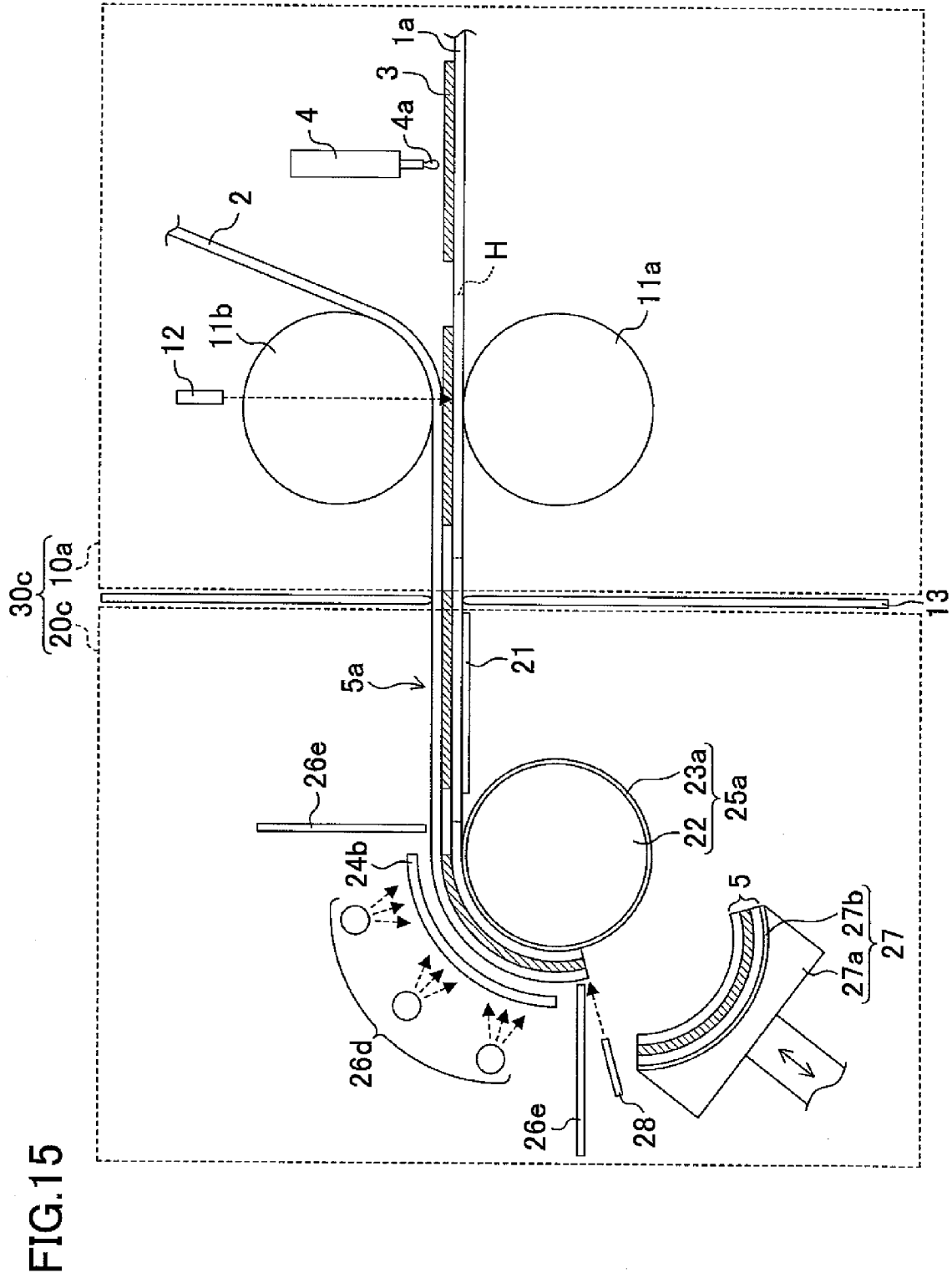
FIG. 15 is a side view of an LCD panel manufacturing apparatus 30c according to a sixth preferred embodiment of the present invention.
Figure 16:
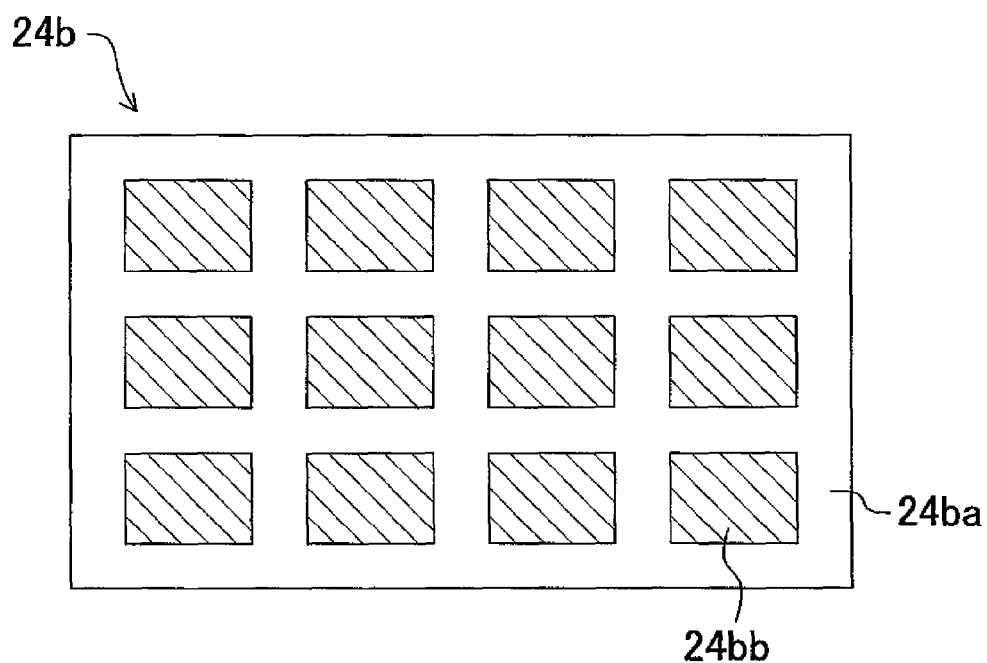
FIG. 16 is a top view of a curved mask 24b of the LCD panel manufacturing apparatus 30c.

FIG. 15 is a side view of an LCD panel manufacturing apparatus 30c of the present preferred embodiment, and FIG. 16 is a top view of a curved mask 24b of the LCD panel manufacturing apparatus 30c.

As shown in FIG. 15, the LCD panel manufacturing apparatus 30c includes a first processing unit 10a and a second processing unit 20c which are connected to each other through a pair of open/close gates 13. Note that the first processing unit 10a is substantially the same as that of the first preferred embodiment.

As shown in FIG. 15, the second processing unit 20c includes: a pressing plate 21 arranged to hold a bonded body 5a formed in the first processing unit 10a from underneath; a molding roll 25a arranged to hold the bonded body 5a pressed on the pressing plate 21 onto its peripheral wall, and molding the bonded body 5a; a plurality of UV lamps 26d provided as light sources to emit UV light to the bonded body 5a held on the peripheral wall of the molding roll 25a; a curved mask 24b to allow the UV light from each UV lamp 26a to be applied to the sealants 3 of the bonded body 5a; a blind mask 26e provided around the plurality of UV lamps 26d; a dividing cutter 28 arranged to divide the bonded body 5a molded by the molding roll 25a along the width direction; and a gripping unit 27 arranged to grip an individual bonded body 5 (5a) divided by the dividing cutter 28. The second processing unit 20c is configured to be switchable between a vacuum atmosphere and an atmospheric atmosphere.

As shown in FIG. 16, the curved mask 24b includes a curved quartz glass 24ba, and light-shielding layers 24bb made of a chromium thin film or the like and formed in a matrix pattern on the quartz glass 24ba. The curved mask 24b is configured so that the light-shielding layers 24bb are respectively superimposed on the display regions D of the bonded body 5a held on the peripheral wall of the molding roll 25a while each UV lamp 26d is emitting UV light. Thus, the curved mask 24b allows the UV light to be applied to the sealants 3a and the peripheral seals 3 of the bonded body 5a, while shielding the liquid crystal material 4a from the UV light. Therefore, the size of the light-shielding layers 24bb needs to be changed as appropriate according to the size of an LCD panel to be manufactured.

A method for manufacturing an LCD panel by using the LCD panel manufacturing apparatus 30c of the above structure will be described below. Note that the manufacturing method of the present preferred embodiment preferably includes a film substrate fabricating step, a seal forming step, a liquid crystal supplying step, a bonding step, a molding step, and a dividing step. Since the film substrate fabricating step, the seal forming step, the liquid crystal supplying step, the bonding step, and the dividing step are similar to those of the first preferred embodiment, description thereof will be omitted.

Molding Step

First, the bonded body 5a pressed in the bonding step is step-transferred and held onto the peripheral wall of the molding roll 25a.

Then, with rotation of the molding roll 25a being stopped, UV light from each UV lamp 26d is applied through the curved mask 24b to the sealants 3a and the peripheral seals 3 of the bonded body 5a held on the peripheral wall of the molding roll 25a, thereby curing the sealants 3a and the peripheral seals 3. The bonded body 5 is thus molded into a curved shape along the peripheral wall of the molding roll 25a.

Then, the dividing step is performed, whereby a curved LCD panel can be manufactured.

According to the manufacturing method of the LCD panel of the present preferred embodiment, the sealants 3a and the peripheral seals 3 can be cured in the molding step by applying the UV light from each UV lamp 26d to the bonded body 5 held on the peripheral wall of the molding roll 25a, while stopping rotation of the molding roll 25a. Note that, in the first preferred embodiment, the light-shielding region formed by the liquid crystal layer 9 can be moved by applying a voltage as appropriate between the transparent electrodes 8a, 8b of the liquid crystal mask 24a. Thus, the sealants 3a and the peripheral seals 3 can be cured while rotating the molding roll 25a in the first preferred embodiment.

Seventh Preferred Embodiment

Figure 17:
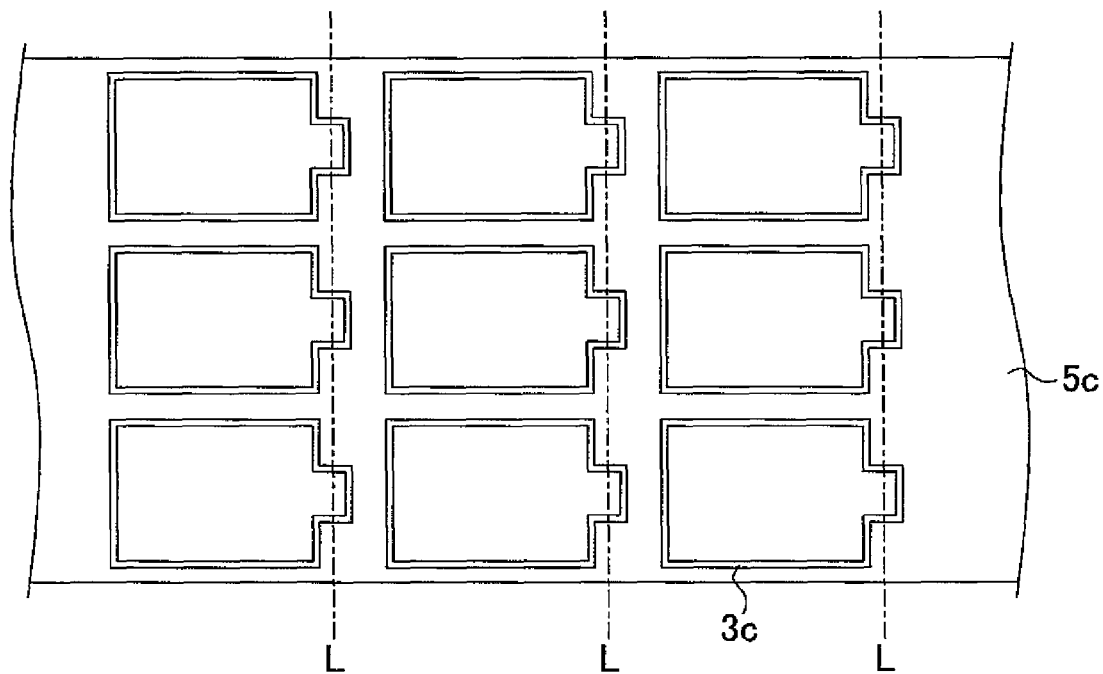
FIG. 17 is a top view of a bonded body 5c according to a seventh preferred embodiment of the present invention.

FIG. 17 is a top view of a bonded body 5c of the present preferred embodiment.

The manufacturing method using an ODF method for bonding the TFT film substrate 1 having the liquid crystal material 4a dropped thereon and the CF film substrate 2 in the first processing unit 10a was described as an example in the above preferred embodiments. However, the present invention is applicable also to a manufacturing method in which a bonded body 5c with no liquid crystal material 4a enclosed therein is formed, and a liquid crystal material is injected after the bonded body 5c is divided into individual bonded bodies.

More specifically, after outer frame sealants 3c (see FIG. 17) formed by connecting a relatively large rectangular shape and a relatively small rectangular shape are formed on, for example, the TFT film substrate 1 in the seal forming step of the first preferred embodiment, the TFT film substrate 1 and the CF film substrate 2 are bonded to form a bonded body 5c. Thereafter, the bonded body 5c is pressed, and then molded into a curved shape and divided into molding units. Moreover, as shown in FIG. 17, a liquid crystal injection port is formed in each sealant 3c by dividing the bonded body 5c along division lines L. Finally, a liquid crystal material is injected into each strip-shaped bonded body 5c by a vacuum injection method. Then, each liquid crystal injection port is sealed, and each strip-shaped bonded body 5c is divided into display regions D, whereby an LCD panel can be manufactured.

Eighth Preferred Embodiment

Figure 18:
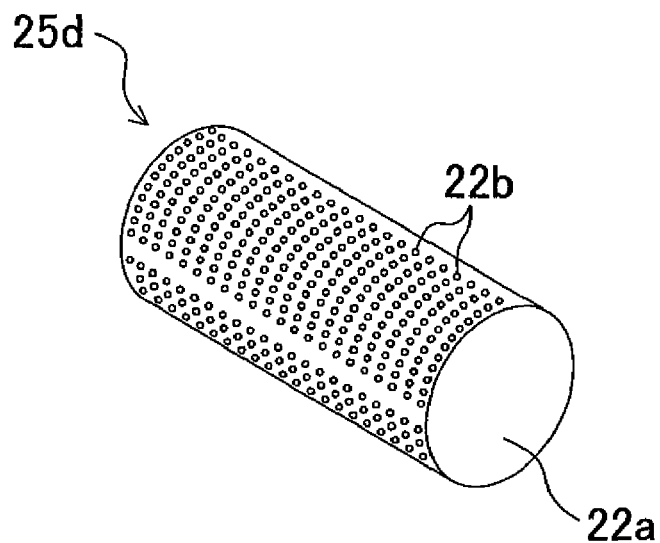
FIG. 18 is a perspective view of a molding roll 25d according to an eighth preferred embodiment of the present invention.

FIG. 18 is a perspective view of a molding roll 25d of the present preferred embodiment.

In the above preferred embodiments, the bonded body pressed on the pressing plate 21 is held onto the peripheral wall of the molding roll by electrostatic force in the second processing unit. However, the bonded body may be vacuum held by a plurality of suction holes 22b formed in the peripheral wall of the molding roll 25b as shown in FIG. 18.

More specifically, as shown in FIG. 18, the peripheral wall of a roll main body 22a is equally divided into a plurality of suction regions along the circumferential direction, and the vacuum holding by the suction holes 22b is switched on or off in each suction region. The molding roll 25d can be used in the second processing unit in this manner.

According to the manufacturing method of the LCD panel using the molding roll 25d of the present preferred embodiment, the plurality of suction holes 22b are formed in the peripheral wall of the molding roll 25d. Thus, suction force can be generated on the peripheral wall of the molding roll 25d by each suction hole 22b of a selected suction region, whereby the bonded body can be attached to, or detached from, the peripheral wall of the molding roll 25b as appropriate.

Other Preferred Embodiments

Figure 19:
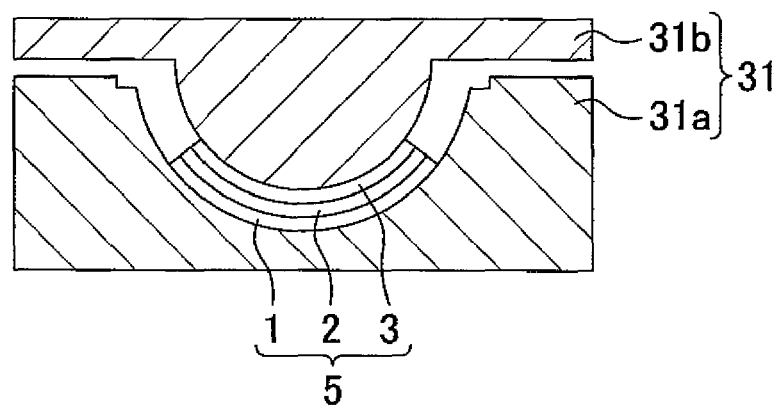
FIG. 19 is a side view of a pressing jig 31 according to another preferred embodiment of the present invention.

In the above preferred embodiments, the sealants and the peripheral seals of the bonded body are cured on the peripheral wall of the molding roll. As shown in FIG. 19, however, an individual bonded body 5 divided into a molding unit may be heated while being pressed by a pressing jig 31 of a female mold 31a and a male mold 31b in order to more completely cure the sealants and the peripheral seal.

Note that, in the above preferred embodiments, a plurality of LCD panels are manufactured from one molding unit. However, one LCD panel may be manufactured from one molding unit.

Moreover, in the above preferred embodiments, the sealants are made of a resin having either a UV-curable or thermosetting property. However, the sealants may be made of a resin having both UV-curable and thermosetting properties.

Moreover, an LCD panel was described as an example in the above preferred embodiments. However, the present invention is not limited to this, and is applicable also to other display panels such as an organic EL display panel.

As described above, the present invention enables a curved display panel to be manufactured at low cost, and thus, is useful for a manufacturing method of a display panel using long film substrates.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An apparatus for manufacturing a display panel by successively bonding a pair of film substrates, each having a plurality of display regions defined at least along a longitudinal direction through a sealant formed in every display region of one of the film substrates, the apparatus comprising:
   a first processing unit arranged to form a straight bonded body by bonding the pair of film substrates so that the respective display regions are superimposed on each other; and
   a second processing unit separated from the first processing unit and including a molding roll configured to hold the straight bonded body formed in the first processing unit onto a peripheral wall thereof, and arranged to mold the straight bonded body into a curved shape along the peripheral wall of the molding roll by curing the sealant while holding the straight bonded body on the peripheral wall of the molding roll.

2. The apparatus of claim 1, wherein an electrode pattern arranged to hold the straight bonded body by electrostatic force is provided in the peripheral wall of the molding roll.

3. The apparatus of claim 1, wherein a suction hole arranged to vacuum hold the straight bonded body is provided in the peripheral wall of the molding roll.

4. The apparatus of claim 1, wherein the second processing unit includes a light source arranged to cure the sealant.

5. The apparatus of claim 4, wherein a reflection suppressing film arranged to suppress reflection of light emitted from the light source is provided in the peripheral wall of the molding roll.

6. The apparatus of claim 1, wherein the second processing unit includes a heat source arranged to cure the sealant.

7. The apparatus of claim 1, wherein the first processing unit includes a pair of bonding rolls, and is configured to bond the pair of film substrates by passing the film substrates between the pair of bonding rolls.

8. The apparatus of claim 1, wherein the first processing unit includes a liquid crystal dispenser arranged to supply a liquid crystal material to every display region of one of the pair of film substrates.

9. The apparatus of claim 1, wherein the first processing unit and the second processing unit are arranged to be usable in a vacuum atmosphere and/or an atmospheric atmosphere.

10. The apparatus of claim 1, wherein the second processing unit includes a dividing cutter arranged to divide the straight bonded body at least into molding units by contacting, on the peripheral wall of the molding roll, the straight bonded body held and molded on the peripheral wall of the molding roll.

11. The apparatus of claim 10, wherein an electrode pattern arranged to hold the straight bonded body by electrostatic force is provided in the peripheral wall of the molding roll, and the electrode pattern has a slit formed at a position where the dividing cutter contacts through the straight bonded body.

* * * * *